(12) United States Patent
Gaudin

(10) Patent No.: US 7,845,684 B2
(45) Date of Patent: Dec. 7, 2010

(54) QUICK CONNECTOR

(75) Inventor: Stephane Gaudin, La Motte (FR)

(73) Assignee: Legris SAS, Rennes (FR)

(*) Notice: Subject to any disclaimer, the term of this patent is extended or adjusted under 35 U.S.C. 154(b) by 77 days.

(21) Appl. No.: 12/464,964

(22) Filed: May 13, 2009

(65) Prior Publication Data

US 2009/0261582 A1 Oct. 22, 2009

(51) Int. Cl.
*F16L 35/00* (2006.01)

(52) U.S. Cl. .......................... 285/93; 285/317

(58) Field of Classification Search .............. 285/93, 285/317

See application file for complete search history.

(56) References Cited

U.S. PATENT DOCUMENTS

| | | | |
|---|---|---|---|
| 5,863,077 A * | 1/1999 | Szabo et al. | 285/93 |
| 5,941,577 A * | 8/1999 | Musellec | 285/317 |
| 6,851,721 B2 * | 2/2005 | Poder | 285/93 |
| 7,128,347 B2 * | 10/2006 | Kerin | 285/93 |
| 7,316,425 B2 * | 1/2008 | Poder | 285/93 |
| 7,390,025 B2 * | 6/2008 | Pepe et al. | 285/93 |
| 7,484,774 B2 * | 2/2009 | Kerin et al. | 285/93 |
| 7,566,077 B2 * | 7/2009 | Tsurumi | 285/93 |

FOREIGN PATENT DOCUMENTS

| | | |
|---|---|---|
| EP | 1582800 A1 | 10/2005 |
| FR | 2827364 | 1/2003 |

OTHER PUBLICATIONS

Written Opinion in corresponding International Application No. PCT/FR2007/001862.

* cited by examiner

*Primary Examiner*—David E Bochna
(74) *Attorney, Agent, or Firm*—John A. Molnar, Jr.

(57) ABSTRACT

A quick connector including a female part with a stepped bore arranged to receive an endpiece and a collar of a male part, and a latch including a ring in a housing arranged in the female part to slide radially between an eccentric position and a position coaxial with the bore, and the latch including a latching indicator mounted to slide radially in the ring between two indication positions, and at least one blocking member for blocking the indicator in a first indication position, the blocking member being movable between an indicator-blocking position and a retracted release position, and having a contact portion projecting into the female portion beyond the latch to co-operate with the collar in such a manner that the collar takes the blocking member into its release position when the male part is inserted into the female part.

11 Claims, 4 Drawing Sheets

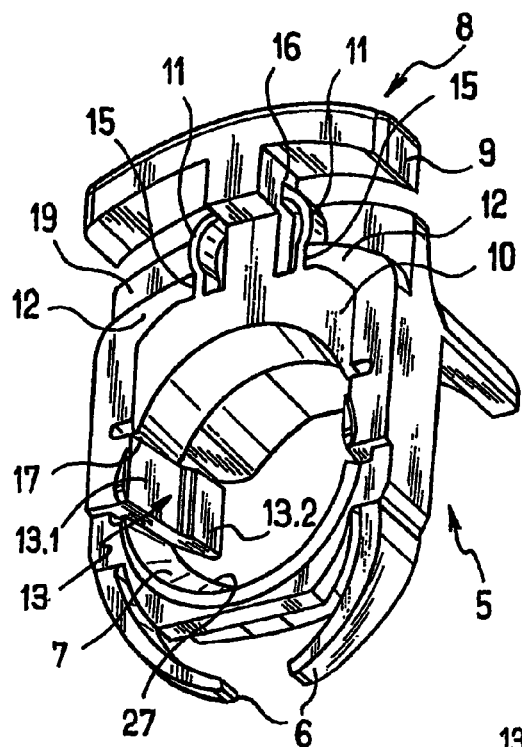
FIG_7
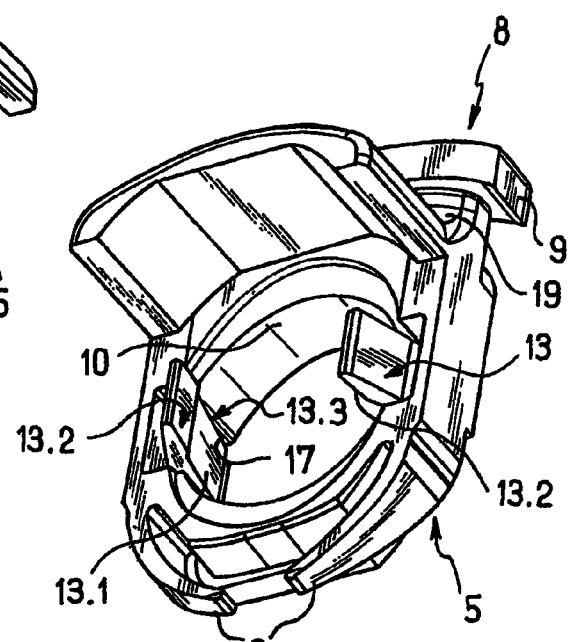
FIG_8
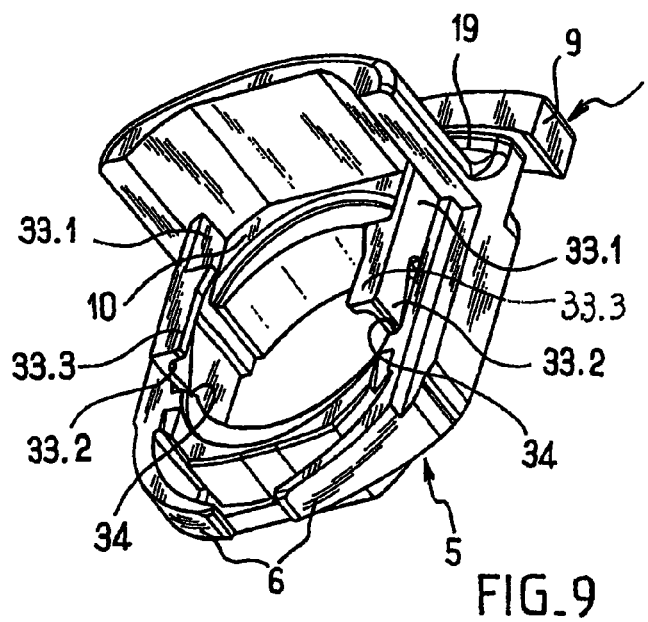
FIG_9

QUICK CONNECTOR

CROSS-REFERENCE TO RELATED CASES

This application is continuation of copending International Application No. PCT/FR07/001,862 filed Nov. 13, 2007, which designated the United States, and which claims priority to French Patent Application 0609995, filed Nov. 15, 2006, the disclosure of each of which is expressly incorporated herein by reference.

BACKGROUND OF THE INVENTION

The present invention relates to a quick connector including a male part and a female part that couple together merely by inserting one into the other.

In pressurized fluid circuits that include quick connectors, it is desirable, or even required, to implement positive latching means for the connection. Poorly-established connection is firstly a source of leakage and secondly runs the risk of coming uncoupled, where the least-harmful consequence is to prevent operation of the machine that includes the pressurized fluid circuit, but that can also give rise to an accident if the machine is a vehicle (no pressure in a hydraulic brake circuit, fuel leaking into the engine compartment giving rise to fire).

Numerous devices exist for latching the male element in the female element of a quick connector. Substantially all of them operate on the same principle, implementing identical general means that consist in a keying member that is interposed between a radial surface of the endpiece (a groove or a collar) and a radial surface of the female element (likewise a groove or a collar). The keying member may be inserted manually or it may be held in its latching position by a resilient return member, with it being possible to place it in a retracted position against the effect thereof (either by moving it or by deforming it) when inserting the endpiece.

In a particularly simple embodiment of such a device, as shown in document FR 2 705 430, the latch is constituted by a ring mounted to slide radially in a housing formed in the female part of the connector between a rest, first position for latching, in which position it is off-center relative to the axis of the bore of the female part, and a retracted, second position for unlatching where it is substantially coaxial with the bore.

A resilient member constituted by two tongues made integrally with the ring is interposed between the ring and the female part and urges the ring towards its first position after the collar has passed through.

It is found that the above latching technique does not provide sufficient guarantee that the male part has been properly pushed home into the female part. The male part might be pushed only sufficiently to cause the collar to force the ring to move against the return spring, but not enough to ensure that the collar has gone beyond the ring, thereby preventing the ring from returning to its latching position behind the collar under the effect of the resilient tongues. That situation need not be immediately obvious to the operator, who might think that the connection has been made properly.

Documents EP0505930, EP0846907, FR2705431, and U.S. Pat. No. 6,145,886 disclose connectors having latching indicators that demonstrate that the connector has been properly latched, the latching indicator being located downstream from the latching member so as to be operated by a collar of the male part after the collar has gone beyond the latching member. In the connectors shown in those documents, the female part has special openings to allow the indicator to co-operate with the collar of the male part during insertion thereof, thereby weakening the female part and complicating fabrication.

In document EP 0 992 729, the indicator is likewise located axially offset from the latching member, but upstream from the latching member at the end of the female part. The indicator is driven not by the collar of the male part, but by an accessory entrained by the male part while it is being inserted in the female part, making that type of connector more complex.

SUMMARY OF THE INVENTION

The invention seeks to remedy those drawbacks, and more particularly it provides a quick connector including a female part with a stepped bore having a first section suitable for sealingly receiving an endpiece of a male part, and a second portion of larger diameter suitable for receiving an external collar on the male part beyond a latch that is constituted by a ring having a through orifice of diameter close to the diameter of the collar, the ring being mounted in a housing formed in the female part at the second section so as to slide radially between an eccentric first position for latching, and a retracted position coaxial with the bore, the latch including a latching indicator mounted to slide radially in the ring between a first indication position in which the latching indicator does not obstruct the through orifice, and a second indication position in which the latching indicator obstructs said through orifice. The latch includes at least one blocking member for blocking the indicator in its first indication position, the blocking member being movable between an indicator-blocking position and a retracted release position, and having a contact portion projecting into the second section towards the first section to co-operate with the collar in such a manner that the collar brings takes the blocking member from its blocking position towards its release position when the male part is inserted in the female part.

Thus, the latching indicator cannot be moved into its second indication position until the collar has retracted the blocking member, such that the ring is then necessarily located behind the collar. It is thus certain that the connection has been made correctly. The indicator in accordance with the invention is incorporated without it being necessary to provide special openings in the female part of the connector, and without requiring additional parts or accessories. The blocking member is thus incorporated in the latch without making special arrangements to the female part, thereby simplifying fabrication. The connector is thus generally unchanged, with only the ring being modified to incorporate the indicator.

In an embodiment of the invention, the latching indicator in the first indication position does not obstruct the through orifice in the ring, while the latching indicator in the second indication position obstructs said through orifice.

In order to verify that the connection between the male part and the female part has been made correctly, the operator making the connection brings the latching indicator into its second indication position after inserting the male part in the female part. The latching indicator in its second indication position then opposes extraction of the male part.

In an illustrative embodiment, the holder means are resilient return means for returning the indicator towards either of its two indication positions on either side of an unstable intermediate position.

When the latching indicator is in the first indication position, it is prevented from moving relative to the ring by the holder means. When the collar has gone past the ring, the ring moves into the rest position, and the latching indicator remains held in the first indication position until it is driven manually by the operator towards the second indication position in which it is once more prevented from moving relative to the ring. These holder means serve to guarantee that the latching indicator remains stationary relative to the ring, and cannot move between the two indication positions unless it is driven deliberately by the operator.

According to an aspect of the invention, the indicator has a drive portion that projects from an outside portion of the female part when the latching indicator is in the first position, and that is substantially retracted relative to the outside portion when the latching indicator is in the second indication position.

The drive portion includes an opening for inserting a driver tool, which opening is accessible when the latching indicator is in the second indication position.

With the drive portion pushed into the female part, it is difficult to take hold of it with the fingers in order to move the drive portion. For this purpose, it is necessary to insert a tool in the opening through a setback provided in the female part giving the tool access to the opening.

The latching indicator also includes an active portion extending from the drive portion towards the inside of the housing of the ring, the active portion being in part in register with walls defining the housing, at least when the latching indicator is in the second indication position.

In two embodiments of the blocking member:

the blocking member has a resilient arm that is secured to the ring and that extends at least in part under the latching indicator when the blocking member is in the blocking position and the latching indicator is in its first indication position, so as to constitute an abutment for the latching indicator, and preferably the arm extends in a substantially axial direction of the ring and possesses a free end arranged to be moved away from said axis by the collar of the male part, thereby retracting the arm relative to the latching indicator; and the blocking member including a resilient leg that is secured to the latching indicator and that extends in part in register with an abutment surface of the ring when the blocking member is in the blocking position and, preferably the leg extends in a direction parallel to the sliding direction of the latching indicator and has a free end portion arranged to be pushed into the second section by the collar, thereby escaping from the abutment surface of the ring.

BRIEF DESCRIPTION OF THE DRAWINGS

The invention can be better understood in the light of the following description of an embodiment of the invention given with reference to the accompanying figures, in which:

FIGS. 7 and 8 are front and rear perspective views of the latch of the first embodiment of the invention;

FIG. 9 is a view analogous to FIG. 8 showing a quick connector latch in a second embodiment;

DETAILED DESCRIPTION OF THE INVENTION

Figure 1:
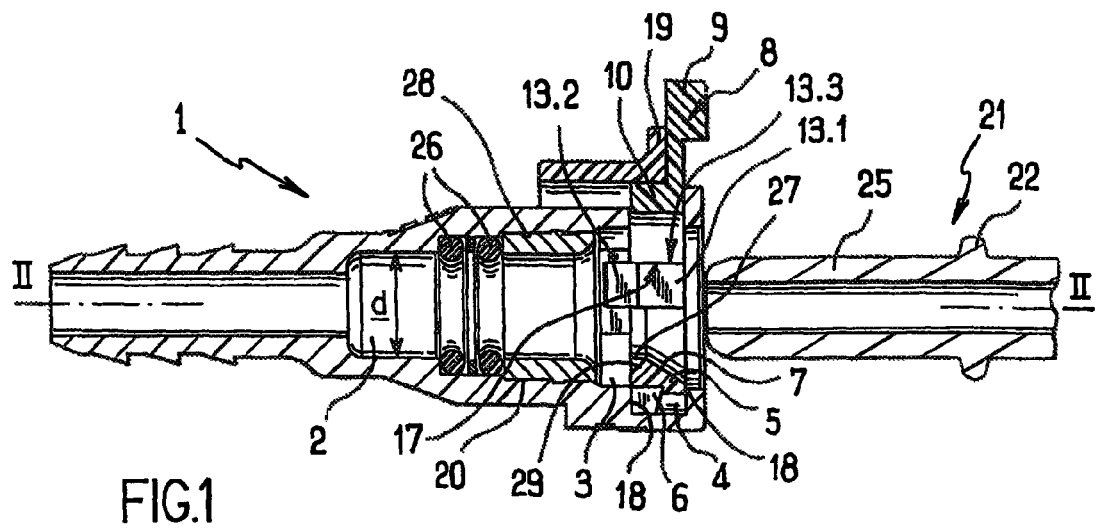
FIG. 1 is a longitudinal section view of a quick connector in a first embodiment of the invention, the male part being shown not yet inserted in the female part, the ring being in the rest position, while the latching indicator is in the first indication position.

With reference to FIG. 1, the connector of the invention includes a female part given overall reference 1, extending along a longitudinal axis and subdivided into a plurality of sections, namely a first section 2 and a second section 3 extending on either side of an intermediate section 20. The section 2 of diameter d is designed to receive a cylindrical endpiece 25 of a male part 21 that is provided on the outside with a collar 22. The intermediate section 20, of diameter greater than d, receives gaskets 26 disposed in the female part 1 so as to bear against the endpiece 25 of the male part 21 in order to seal the connection, and a guide insert 28 for guiding the male endpiece 25 in the female part 1. The second section 3 of diameter D greater than the diameter of the intermediate section 20 and greater than the diameter of the collar 22 is designed to receive the collar 22. The section 3 is provided with a housing 4 defined by two facing plane side walls 18 that extend perpendicularly to the axis of the female part 1, thereby forming a passage to enable a ring 5 to slide radially in the housing 4. According to the invention, the housing 4 also receives a latching indicator 8, described in greater detail below.

With reference also to FIGS. 7 and 8, the ring 5 includes, in known manner, resilient tongues 6 that bear against the bottom of the housing 4 and that exert a return force towards a return position for the ring 5, which position is defined, in known manner, by co-operation between steps in the housing 4 and steps on the ring 5.

The ring 5 also has a conical surface 7 extending along a cone as far as a circular edge 27 of diameter slightly greater than the diameter D of the section 3. The edge 27 defines a portion of a circular orifice for passing the collar 22 through the ring 5.

This orifice is embodied here solely by the edge 27, however it should be considered as being a virtual orifice of axis parallel to the axis of the female part 1 and presenting a cylindrical shape of diameter slightly greater than the diameter of the collar 22.

According to the invention, the female part 1 is provided with a latching indicator given overall reference 8.

The latching indicator 8 includes a drive portion 9 in the form of a T-shape projecting from the ring 5, and an active portion 10 that is slidably received in the ring 5 and that is connected to the drive portion 9 via the free end of the upright of the T-shape.

Two prongs 11 extend from the active portion 10 on either side of the upright of the T-shape of the drive portion 9, each prong presenting an intermediate portion that is curved convexly away from the upright of the T-shape. The prongs 11 form a rubbing and resilient bearing surface for two branches 12 of the ring 5. The prongs 11 define recesses 15, 16 in the vicinity of the active portion 10 and in the vicinity of the drive portion 9 so as to define respectively a first indication position in which the active portion 10 and the edge 27 define a through section of diameter greater than that of the collar 22 and the free ends of the branches 12 are received in the recesses 15, and a second indication position in which the active portion 10 and the edge 27 define a through section of diameter close to that of the endpiece 25, and the free ends of the branches 12 are received in the recesses 16. It will be understood that the curved intermediate portions of the prongs 11 form a hard point defining an unstable position in the movement of the latching indicator 8 between its first indication position and its second indication position, which indication positions are themselves stable. In the first indication position, the drive portion 9 of the latching indicator 8 projects from an outside portion 19 of the ring. In the second indication position, the drive portion 9 is flush with the outside portion 19.

The ring 5 includes a blocking member for blocking the latching indicator 8 in its first indication position.

The blocking member includes two arms 13, each having an end portion 13.1 secured to the ring 5 under the active portion 10 of the latching indicator 8, and an end portion 13.2 that is free, extending axially to project from the ring 5 via a side thereof opposite from the latching indicator 8, i.e. into the second section 3 in this example. The arms 13 are elastically deformable between:

a blocking state in which the end portions 13.2 of the arms 13 are separated by a distance smaller than the diameter of the collar 22 and in which the end portions 13.1 of the arms 13 prevent an abutment surface 13.3 extending under side portions 17 of the active portion 10 of the latching indicator 8 in its first indication position, thereby opposing movement of the latching indicator 8 towards its second indication position; and a release state in which the end portions 13.2 are spaced apart by a distance equal to the diameter of the collar 22 and in which the abutment surfaces 13.3 are retracted relative to the side portions 17 of the active portion 10, thereby allowing the latching indicator 8 to move towards its second indication position.

In the position shown in FIG. 1, the through orifice has its axis offset from the axis of the female part 1. The conical surface 7 then leaves a free passage for the endpiece 25 of the male part in the section 2, but forms an obstacle for insertion of the collar 22 into the section 3 downstream from the ring 5. The latching indicator 8 is in its first indication position.

Figure 2:
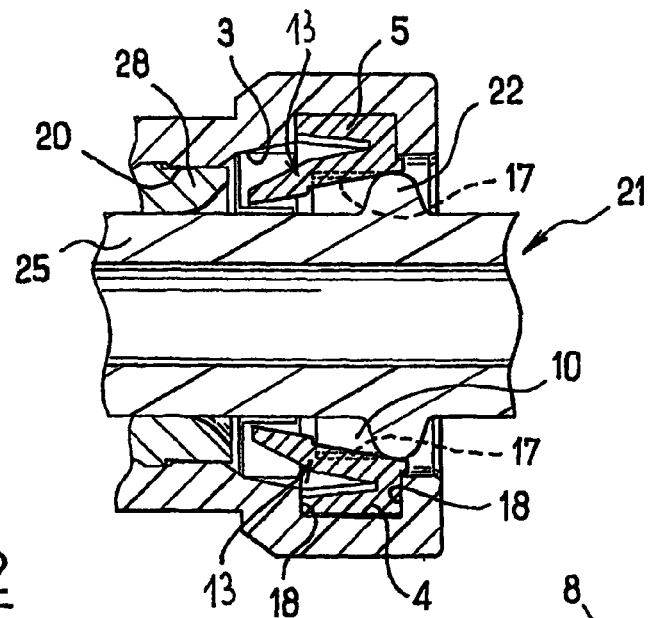
FIG. 2 is a fragmentary view from beneath of the quick connector in section on line II-II of FIG. 1, the collar of the male part penetrating into the latch.
Figure 3:
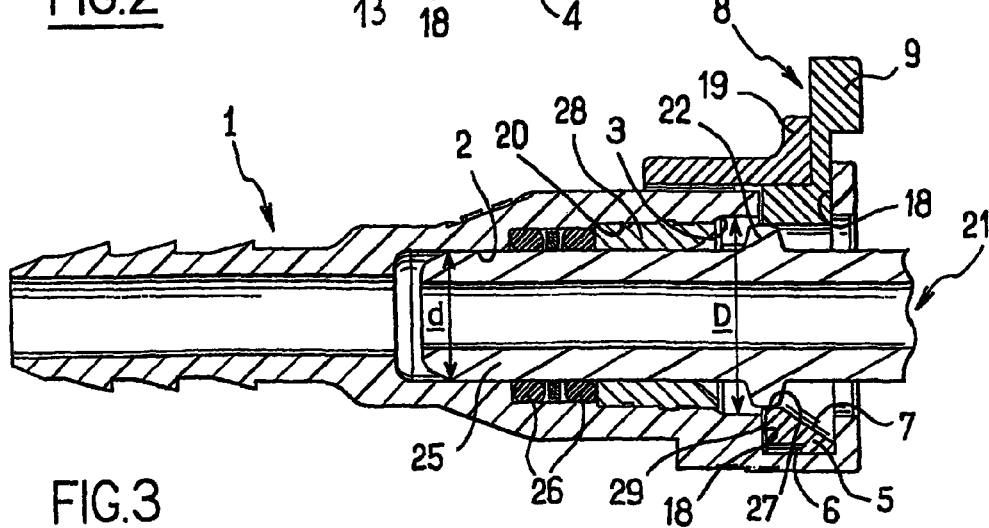
FIG. 3 is a view analogous to FIG. 1, the collar having moved the latch into its retracted position.

In FIGS. 2 and 3, the cylindrical endpiece 25 of the male part 21 has been slid between the ring 5 and the latching indicator 8 so as to be inserted in the section 2 of the female part, and it has been possible to slide the collar 22 under the active portion 10 of the latching indicator 8, but it has come into abutment against the conical surface 7 of the ring 5 (see FIG. 2).

By forcing the male part 21 into the female part 1, the ring 5 is caused to move radially under the effect of the collar 22 thrusting against the conical surface 7 that forms a ramp, and against the return force exerted by the flexible tongues 6. The ring 5 moves until the edge 27 of the conical surface 7 passes under the collar 22, which position is shown in FIG. 3. In this position, the through orifice defined by the edge 27 and the active portion 10 is centered on the axis of the female part 1, the latching indicator 8 being retained in its first indication position by the branches 12 of the ring 5, with the free ends thereof being received in the hollow 15, such that the latching indicator 8 does not obstruct the through orifice. The collar 22 can then pass between the ring 5 and the portion of the latching indicator 8 in its first indication position.

Figure 4:
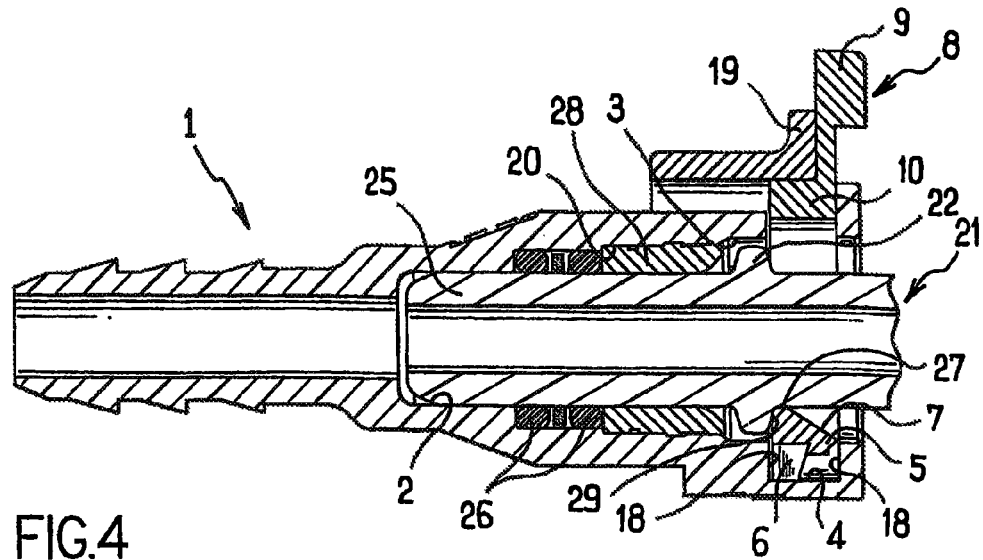
FIG. 4 is a view analogous to FIG. 1, the ring being in its rest position while the latching indicator is in its first position.

In FIG. 4, the collar 22 has gone beyond the ring 5, and the ring has returned to its initial rest position under the effect of the return force exerted by the flexible tongues 6. The through orifice once more has its axis offset, with the latching indicator 8 still in the first indication position, while the drive portion 9 projects clearly from the female part 1.

In this position, the periphery of the ring 5 faces the walls 18 of the housing 4, while the ring 5 possesses a wall portion 29 facing the collar 22. The ring 5 forms a latch that latches the connection between the male part 21 and the female part 1, opposing withdrawal of the male part 21.

Figure 5:
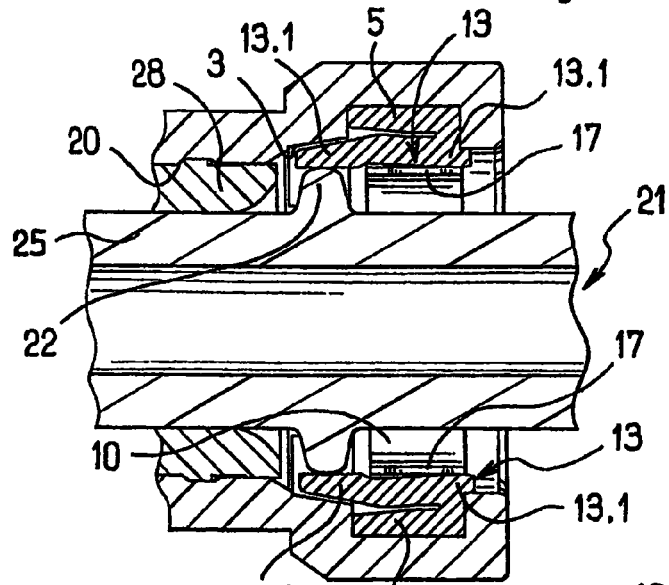
FIG. 5 is a fragmentary view from below of the quick connector, in section on line V-V of FIG. 4.

In addition, as can be seen in FIG. 5, the collar 22 received in the second section 3 beyond the ring 5 has moved the end portions 13.2 of the arms 13 apart so as to bring them into their release state.

Figure 6:
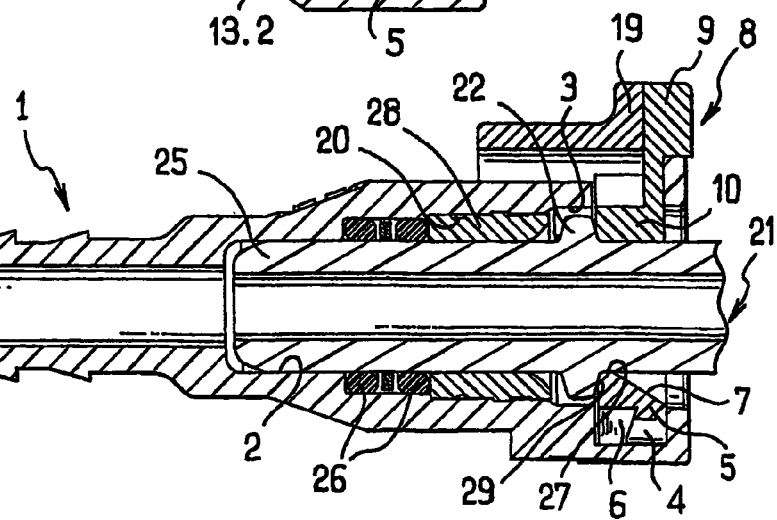
FIG. 6 is a view analogous to FIG. 1 after the male part has been pushed home into the female part, the ring being in the rest position, while the latching indicator is in the second indication position.
Figure 10:
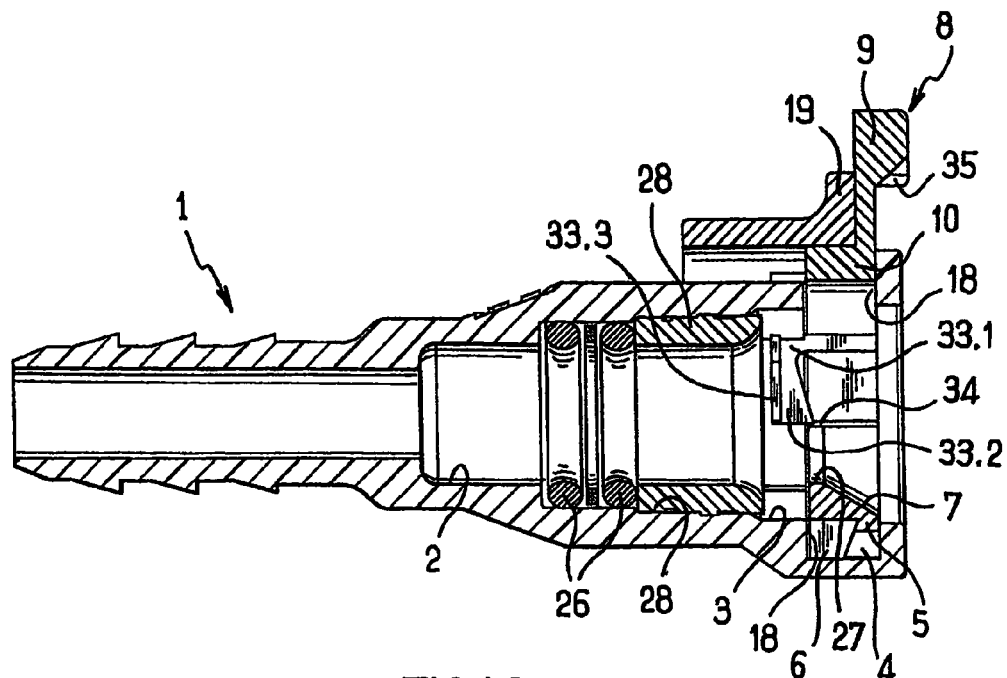
FIG. 10 is a view analogous to FIG. 1 of a quick connector in accordance with the second embodiment.
Figure 11:
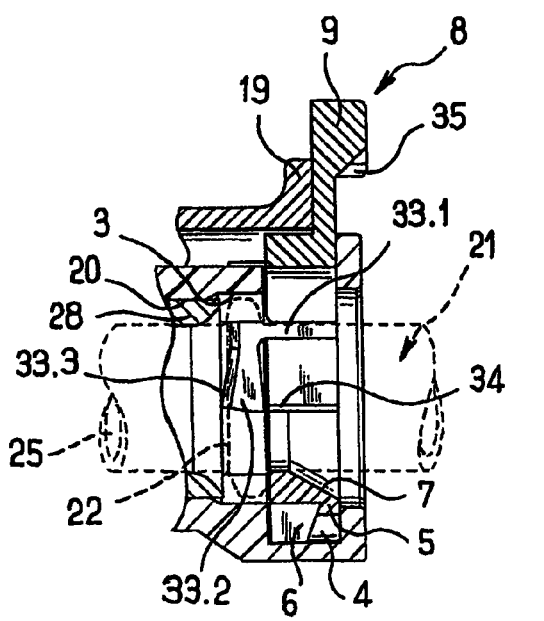
FIG. 11 is a fragmentary view analogous to FIG. 10, once the male part has been pushed home into the female part, the ring being in the rest position while the latching indicator is in the first indication position.
Figure 12:
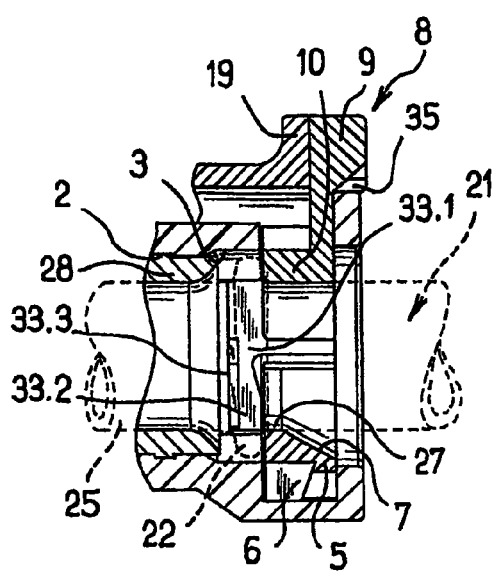
FIG. 12 is a view analogous to FIG. 11, after the latching indicator has been moved into the second indication position, the ring being in the rest position.

The operator can then confirm the connection by pressing on the drive portion 9 of the latching indicator 8, so as to bring the indicator into its position shown in FIG. 6, which is the second indication position, and in which the ends of the branches 12 of the ring 5 are snapped into the recesses 16 defined by the prongs 11 of the latching indicator 8.

If it is possible to move the indicator, that indicates the collar 22 is properly pushed into the female part 1 beyond the ring 5, and that the ring has been able to return to its initial rest position.

If the male part has been pushed only part way into the female part 1, without the collar 22 reaching the ring 5, and the operator then presses on the drive portion 9 of the latching indicator 8, the ring and indicator assembly will move against the flexible tongues 6: the side portions of the active portion 10 of the latching indicator 8 come into abutment against the abutment surfaces 13.3 and bring the ring 5 into the centered position. When the operator stops pressing, the ring 5 rises to return to its initial position and the drive portion 9 of the latching indicator 8 projects from the outside portion 19 of the ring 5. The operator can thus observe visually that the connection has been made.

Should it happen that the collar 22 goes past the ring 5, but without the ring returning to its initial position, e.g. because of the presence of an obstacle or because of one of the flexible tongues 6 breaking, then the operator can see prior to applying any pressure that the latching indicator 8 has remained in an intermediate position with the drive portion 9 still projecting from the outside portion 19. If the operator does not notice this and attempts to press the latching indicator 8 into the second indication position, then the drive portion 9 continues to project from the outside portion 19 of the ring 5. The operator is then also made aware that the connection has not been made properly.

In the second indication position, the latching indicator 8 projects very little from the outside portion 19, unlike the situations mentioned above. Observing the position of the latching indicator 8 thus makes it possible at a glance to verify whether the connection has been made properly and has been confirmed by the operator.

The latching indicator 8 thus provides a visual indication that a proper connection has been made.

The recesses 15 and 16 defined by the prongs 11 and the branches 12 of the ring 5 are defined in such a manner that the force needed to bring the latching indicator 8 from the first indication position to the second indication position, and to snap the latching indicator 8 into the second indication position is less than the force needed to cause the flexible tongues 6 of the ring 5 to bend.

Furthermore, moving the latching indicator 8 into the second indication position serves to reinforce opposition to the male part 21 being removed from the female part 1. As can be seen in FIG. 6, the active portion 10 of the latching indicator 8 faces the collar 22 and thus projects into the through orifice in the ring 5, and the active portion 10 and the base of the drive portion 9 face the walls 19 of the housing 4. The latching indicator 8 thus constitutes an obstacle against withdrawing the male part 21 from the female part 1.

The latching indicator 8 thus also acts as a latch, adding its own effect to the effect of the ring 5 for increasing opposition to the male part 21 being pulled out from the female part 1.

In order to disconnect the male part 21 from the female part, it is necessary to return the latching indicator into its first indication position. Since the drive portion 9 is pressed against the female part 1, it is not possible to move the latching indicator 8 by hand. It is necessary to insert the end of a tool between the drive portion 9 of the latching indicator 8 and the female part 1, and to pull on the latching indicator 8 in order to return it into the first indication position. It is therefore not possible to return the latching indicator 8 unintentionally into the first indication position once it has been placed in the second indication position.

It is then necessary to press on the outside portion 19 of the ring 5 in order to retract the ring into a position similar to that shown in FIG. 3. The collar 22 can then pass between the ring 5 and the active portion 10 of the latching indicator 8.

In the second embodiment of the invention, the female part 1 and the male part 21 are identical to those of the first embodiment, the quick connector of the second embodiment differing from that of the first embodiment only in the structure of the blocking member.

Thus, as shown in FIGS. 9 to 12, the blocking member has two resilient legs 33 that are secured to the latching indicator 8 via respective end portions 33.1 and each of which has a free end portion 33.2 that extends partially in register with an abutment surface 34 of the ring 5 when the blocking member is in the blocking position. Each leg 33 extends in a direction parallel to the sliding direction of the latching indicator 8 and has its free end portion 33.2 provided with a fin 33.3 for making contact with the collar 22 so that the free end portion 33.2 can be pushed into the second section 3 by the collar 22 and thus escape from the abutment surface 34 of the ring 5. The latching indicator 8 can then be moved into second indication position.

The drive portion 9 includes an opening 35 for inserting a driver tool (e.g. a screwdriver), which opening is accessible when the latching indicator 8 is in the second indication position so as to enable the latching indicator 8 to be returned to its first indication position.

The operation of the quick connector in the second embodiment is identical to that of the quick connector in the first embodiment.

The invention is not limited of the particular embodiments described above, but on the contrary covers any variant that comes within the ambit of the invention as defined by the claims.

The tabs 13 and 33 may be moved into their release position (e.g. by means of a hinge), rather than being deformed.

The invention may be implemented by combining and/or dynamically inverting the embodiments described above.

The means for preventing the latching indicator from moving in the ring may be means that are breakable and/or snap-fastener means.

The shapes of the ring and of the indicator may be other than those described. In particular, the outside portion 19 and the drive portion 9 may have any shape that makes it possible visually to perceive any change of position of one relative to the other.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A quick connector for connection to a component in a fluid circuit, the component having a distal male end and a collar adjacent to the male end, the connector comprising:
   a generally tubular body having a female end and a bore extending along a central longitudinal axis of the body, the bore having a first section sized for receiving the distal end of the male component therein, and a second section opening into the female end, the second section being sized for receiving the collar of the male component therein; and
   a latch comprising:
      a ring member having an opening disposed in the second section of the bore, the opening being sized to receive the collar of the male component therethrough;
      an indicator member slidably moveable radially in the ring member between a first indicator position wherein the indicator member does not obstruct the opening of the ring member, and a second indicator position wherein the indicator member obstructs the opening of the ring member; and
      at least one blocking member movable between a blocking position maintaining the indicator member in its first indicator position and a release position allowing the indicator member to move to its second indicator position, the blocking member having a contact portion projecting into the second section of the bore towards the first section thereof, the contact portion being engageable by the collar urging the blocking member from its blocking position to its release position as the distal end of the male component is inserted into the female end of the connector,
   the latch being slidably moveable radially relative to the longitudinal axis of the body between an extended latch position disposing the opening of the ring member eccentrically to the longitudinal axis, and a retracted latch position disposing the opening of the ring member coaxially with the longitudinal axis.

2. The quick connector of claim 1 wherein:
   the ring member has an outside portion extending external to the bore; and
   the indicator member has a drive portion projecting out from the outside portion of the ring member away from the bore when the indicator member is disposed in its first indicator position, the drive portion being retracted relative to the outside portion of the ring member in towards the bore when the indicator member is disposed in its second indicator position.

3. The quick connector of claim 2 wherein the drive portion has a port for inserting a driver tool, the port being accessible when the indicator member is disposed in its second indication for enabling the indicator member to be returned from its second indicator position its first indicator position responsive to the insertion of the driver tool into the port.

4. The quick connector of claim 2 wherein the indicator member has an active portion extending in from the drive portion towards the bore, the active portion defining a radial wall portion of the bore when the indicator member is disposed in its second indicator position.

5. The quick connector of claim 1 wherein the blocking member comprises a resilient arm connected to the ring member, the arm extending as an abutment under the indicator member when the blocking member is disposed in its blocking position and the indicator member is disposed in its first indicator position.

6. The quick connector of claim 5 wherein the arm extends away from the ring member in an axial direction along the longitudinal axis, the arm having a free end movable in a radial direction away from the longitudinal axis urging the arm out from under the indicator member upon the free end being engaged by the collar as the distal end of the male component is inserted into the female end of the connector.

7. The quick connector of claim 1 wherein the blocking member comprises a resilient leg connected to the indicator member, the ring having an abutment surface and the leg engaging the abutment surface when the blocking member is disposed in its blocking position.

8. The quick connector of claim 7 wherein the leg extends in a direction generally parallel to the sliding direction of the indicator member, the leg having a free end moveable to disengage the leg from the abutment surface of the ring upon contact with the collar as the distal end of the male component is inserted into the female end of the connector.

9. The quick connector of claim 1 wherein the indicator member and the ring member are interferingly engaged to delimit relative movement therebetween when the indicator member is disposed in either its first or its second indicator position.

10. The quick connector of claim 9 wherein the indicator member is formed as having at least one prong and the ring member is formed as having at least one free end interferingly engaged with the prong.

11. The quick connector of claim 10 wherein the prong is generally convexly-curved such the indicator member is urged towards a corresponding one of its first or its second indicator portions when the indicator member is disposed in an intermediate position with the at least one free end of the ring member being engaged with the prong on a corresponding side thereof.

\* \* \* \* \*